United States Patent
Bauer

(10) Patent No.: US 9,919,594 B2
(45) Date of Patent: Mar. 20, 2018

(54) METHOD FOR OPERATING A FUEL TANK SYSTEM FOR AN AUTOMOBILE AND CORRESPONDING FUEL TANK SYSTEM

(71) Applicant: Audi AG, Ingolstadt (DE)

(72) Inventor: Florian Bauer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 179 days.

(21) Appl. No.: 14/930,109

(22) Filed: Nov. 2, 2015

(65) Prior Publication Data

US 2016/0121713 A1    May 5, 2016

(30) Foreign Application Priority Data

Nov. 3, 2014   (DE) .................. 10 2014 016 190

(51) Int. Cl.
*B60K 15/03* (2006.01)
*B60L 15/20* (2006.01)
(Continued)

(52) U.S. Cl.
CPC .......... *B60K 15/03* (2013.01); *B60L 15/2045* (2013.01); *B60W 20/00* (2013.01); *B60W 30/18* (2013.01); *B62D 39/00* (2013.01); *G01F 23/0007* (2013.01); *G01F 23/0061* (2013.01); *G05D 1/0088* (2013.01); *B60K 2015/0321* (2013.01); *B60K 2015/03111* (2013.01); *B60K 2015/03217* (2013.01);
(Continued)

(58) Field of Classification Search
CPC ...... G01F 23/0076; G01F 23/32; G01F 23/20; G01F 23/263; G01F 23/2962; G01F 23/36; G01F 25/0061; G01F 1/68; G01F 22/00; G01F 23/0061; G01F 23/22; G01F 9/008; B60K 2015/03217; B60K 15/03006

See application file for complete search history.

(56) References Cited

U.S. PATENT DOCUMENTS

2004/0079150 A1* 4/2004 Breed .................. B60J 10/00
                                                   73/291
2006/0137429 A1* 6/2006 Henschel ........... G01F 25/0061
                                                   73/1.73
(Continued)

FOREIGN PATENT DOCUMENTS

CN      201851239 U     6/2011
DE      102004003178    8/2005
(Continued)

OTHER PUBLICATIONS

DE102004003178_Rongstock. 2004 102004003178—machine translation 102004003178—claims—machine translation.*
(Continued)

*Primary Examiner* — Jelani A Smith
(74) *Attorney, Agent, or Firm* — Henry M. Feiereisen LLC

(57) ABSTRACT

In a method for operating a fuel tank system for a motor vehicle, with the fuel tank system having a fuel tank and an accumulation tank to which a suction side of a fuel pump is connected, at least one sensor determines a geodetic orientation of the fuel tank when a fill level of the fuel tank is below a predetermined minimum fill level. A fueling parameter is read out from a characteristic curve field based on the geodetic orientation, and the fueling parameter is displayed by a signaling device.

11 Claims, 1 Drawing Sheet

(51) Int. Cl.
  *B60W 30/18*   (2012.01)
  *G05D 1/00*    (2006.01)
  *B62D 39/00*   (2006.01)
  *B60W 20/00*   (2016.01)
  *G01F 23/00*   (2006.01)

(52) U.S. Cl.
  CPC ....... *B60Y 2400/90* (2013.01); *Y02T 10/7258* (2013.01); *Y10S 903/902* (2013.01)

(56) References Cited

U.S. PATENT DOCUMENTS

| | | | | |
|---|---|---|---|---|
| 2009/0143923 | A1* | 6/2009 | Breed | G08G 1/205 701/1 |
| 2013/0019843 | A1 | 1/2013 | Iwaya et al. | |
| 2014/0360260 | A1* | 12/2014 | Dudar | G01F 23/22 73/204.11 |
| 2015/0369151 | A1* | 12/2015 | Dudar | F02D 41/0032 141/4 |

FOREIGN PATENT DOCUMENTS

| | | | |
|---|---|---|---|
| DE | 102004003178 A1 * | 8/2005 | ........... G01F 23/303 |
| DE | 102004008036 | 9/2005 | |
| DE | 102012217891 | 4/2014 | |
| DE | 102012020321 | 5/2014 | |
| FR | 2 907 212 B1 | 4/2008 | |
| WO | WO 2014/057093 A1 | 4/2014 | |

OTHER PUBLICATIONS

Chinese Search Report issued by the Chinese Patent Office dated Jun. 2, 2017 in counterpart Chinese Application No. 2015107339730.

English translation of Chinese Search Report issued by the Chinese Patent Office dated Jun. 2, 2017 in counterpart Chinese Application No. 2015107339730.

* cited by examiner

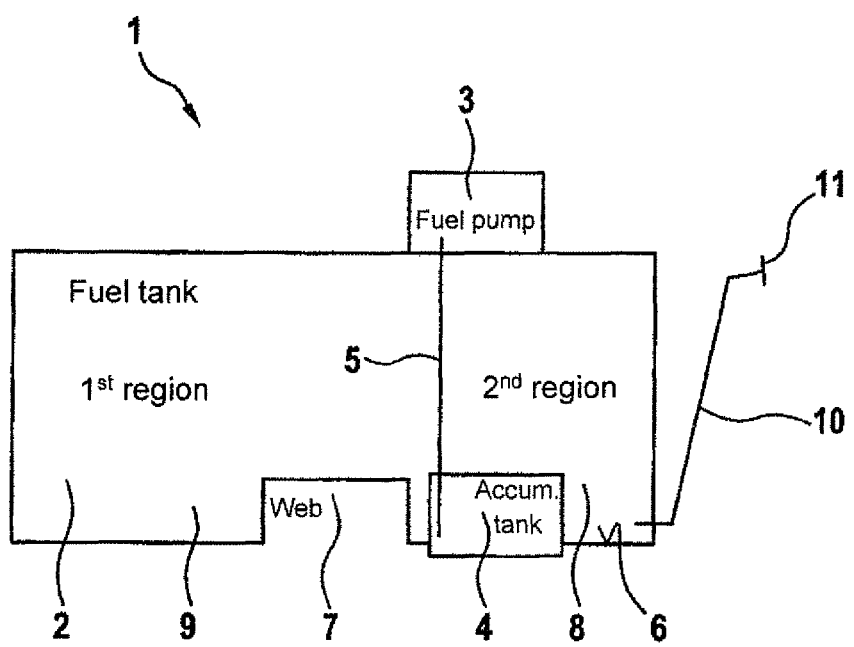

METHOD FOR OPERATING A FUEL TANK SYSTEM FOR AN AUTOMOBILE AND CORRESPONDING FUEL TANK SYSTEM

CROSS-REFERENCES TO RELATED APPLICATIONS

This application claims the priority of German Patent Application, Serial No. 10 2014 016 190.0, filed Nov. 3, 2014, pursuant to 35 U.S.C. 119(a)-(d), the content of which is incorporated herein by reference in its entirety as if fully set forth herein.

BACKGROUND OF THE INVENTION

The present invention relates to a method for operating a fuel tank system for a motor vehicle and to a fuel tank system.

The following discussion of related art is provided to assist the reader in understanding the advantages of the invention, and is not to be construed as an admission that this related art is prior art to this invention.

A fuel tank system is, for example, associated with or is a part of the motor vehicle. The fuel tank system serves to temporarily store fuel, which is used, for example, to perform a driving operation of the motor vehicle, in particular when using an internal combustion engine. The fuel tank system includes the fuel tank, in which the fuel can be temporarily stored. The fuel tank includes the accumulation tank, which is suitably located inside the fuel tank, in particular at a bottom of the fuel tank.

The suction side of the fuel pump, which is used for pumping fuel from the fuel tank, is connected to the accumulation tank. For example, the fuel is conveyed in the direction of the internal combustion engine by the fuel pump. The accumulation tank, which can also be referred to as a surge tank, is used to collect fuel at a location of the fuel tank where the fuel is to be withdrawn by the fuel pump. Using the accumulation tank therefore ensures that fuel can be withdrawn even when only a small quantity of fuel remains in the fuel tank, in particular for operating the internal combustion engine.

It would be desirable and advantageous to address prior art shortcomings and to provide an improved method for operating a fuel tank system for a motor vehicle, to enable reliable pumping fuel from the fuel tank after the fuel tank is filled with a comparatively small quantity of fuel after having been completely emptied.

SUMMARY OF THE INVENTION

According to one aspect of the present invention, a method for operating a fuel tank system for a motor vehicle, wherein the fuel tank system comprises a fuel tank with an accumulation tank to which a suction side of a fuel pump is connected, includes determining with at least one sensor a geodetic orientation of the fuel tank when a fill level of the fuel tank is below a predetermined minimum fill level; reading out a fueling parameter from a characteristic curve field based on the geodetic orientation; and displaying the fueling parameter by way of a signaling device.

It is desirable that even after the fuel tank of the motor vehicle has been substantially emptied, in particular completely emptied, fuel can be withdrawn from the fuel tank, for example, for operating the internal combustion engine, after a small quantity of fuel has been filled in the fuel tank that is small compared to the volume of the fuel tank. This means that sufficient fuel should reach the accumulation tank when filling the small quantity of fuel.

For this reason, an inlet conduit may be provided, via which a flow connection is made between a filler neck and the accumulation tank. When fuel is filled through the filler neck, at least a certain proportion of the fuel now does not flow into the fuel tank at an arbitrary location, but is guided into the accumulation tank through the inlet conduit. There, the fuel is subsequently available and allows reliable operation of the fuel pump.

Under certain circumstances, however, providing such inlet conduit may not be desirable. This means, however, that the fuel must be reliably guided from the filler neck to the accumulation tank even without such an inlet conduit in order to already allow with the above-mentioned small quantity of fuel a reliable conveyance of fuel and therefore operation of the internal combustion engine.

For this reason, certain precautions are taken when a fill level of the fuel tank is smaller than the minimum fill level. The minimum fill level may advantageously correspond to an empty fuel tank or to an at least almost empty fuel tank, wherein in the latter case, for example, at most 2%, at most 1%, at most 0.5%, at most 0.25% or at most 0.01% of the volume of the fuel tank is filled with fuel. Alternatively or additionally, these precautions may also be taken under other conditions, for example upon a request from the driver. The precautions may also be instituted permanently.

With the aforementioned precautions taken into consideration, the geodetic orientation of the fuel tank or the fuel tank system may be determined by way of the sensor. For example, the geodetic orientation of the motor vehicle may be determined and the orientation of the fuel tank may be deduced therefrom. Subsequently, the fueling parameter is determined based on the geodetic orientation. For this purpose, the characteristic curve field is provided, in which advantageously a respective fueling parameter is stored for each of a plurality of geodetic orientations. The geodetic orientation is read out and then used as an input variable for the characteristic curve field which then provides the fueling parameter as output variable. The fueling parameter or a quantity derived therefrom is then displayed by way of the signaling device.

The fueling parameter describes in particular, whether of the accumulation tank is expected to be successfully filled according to the currently present geodetic orientation of the fuel tank when the fuel tank is filled with a specific quantity of fuel, in particular through the filler neck. This is indicated to a driver of the motor vehicle by way of the signaling device. Other measures may, of course, also be taken instead of or in addition to a display with the signaling device.

For example, in particular after a request from the driver of the motor vehicle, the motor vehicle may be operated such that the particular geodetic orientation of the fuel tank is attained, for which the fueling parameter indicates that the expected proportion of the fuel quantity filled or be filled through the filler neck and flowing into the accumulation tank corresponds to at least a minimum proportion. To this end, the filling orientation closest to the geodetic orientation is advantageously read from the characteristic curve field, for which the fueling parameter indicates that the proportion flowing into the accumulation tank is greater than or equal to the minimum proportion.

According to an advantageous feature of the present invention, an at least partially, in particular completely autonomous operation of the motor vehicle may be provided for automatically aligning the fuel tank in the fueling orientation. For example, at least one environment sensor may be used for its implementation. Additionally or alternatively, a chassis of the motor vehicle, in particular at least one spring assembly or shock absorber arrangement, may be adjusted such that the fuel tank is displaced in the fueling orientation or at least in the direction of the fueling orientation. The spring assembly is hereby constructed, for example, as a fluid spring, in particular as an air spring. Advantageously, at least one valve associated with the fluid spring is controlled for aligning the fuel tank.

According to another advantageous feature of the present invention, a respective fueling parameter may be stored in the characteristic curve field for a variety of orientations of the fuel tank, wherein the fueling parameter indicates whether, with a corresponding orientation, at least a minimum proportion of a quantity of fuel filled through a filler neck flows into the accumulation tank. It is usually not necessary that the entire quantity of fuel that is filled through the filler neck flows into the accumulation tank where it is subsequently available. Instead, this should apply only to the minimum proportion of the quantity of fuel. However, as an alternative, the entire quantity of fuel may of course also be conveyed, so that the minimum proportion is equal to 100%.

The fueling parameter, which is stored for each of the stored orientations, hence describes whether after filling the determined quantity of fuel through the filler neck, the minimum proportion can be expected to flow into the accumulation tank where it is subsequently available. Advantageously, this is the case for at least one of the stored orientations. Advantageously, the characteristic curve field can be matched to, i.e. generated for the determined quantity of fuel.

Of course, several characteristic curve fields may be provided for different fuel quantities to be filled and the appropriate characteristic curve field may be selected as a function of the quantity of fuel to be filled and the fueling parameter may be read therefrom depending on the geodetic orientation. For example, the driver of the vehicle may specify the quantity of fuel to be filled, i.e. the fuel quantity which he intends to fill through the filler neck. Typically, a fuel volume of 5 liter is assumed as a specified quantity of fuel, which corresponds to the capacity of a conventional fuel canister.

According to another advantageous feature of the present invention, the orientation may include a roll angle and/or a pitch angle. The roll angle refers to a deflection of the fuel tank about a longitudinal axis of the motor vehicle, while the pitch angle refers to a deflection about a transverse axis. The transverse axis is perpendicular to the longitudinal axis, but is likewise also arranged parallel to a support surface of the motor vehicle. A vertical axis of the motor vehicle is perpendicular to both the longitudinal axis and the transverse axis. The geodetic orientation may include either only the roll angle or only the pitch angle or both. In the latter case, the characteristic curve field indicates the fueling parameter as a function of both the roll angle and the pitch angle.

According to another advantageous feature of the present invention, an optical and/or acoustic signal can be generated with the signaling device. In principle, the display can be arbitrary. Advantageously, however, the driver is made aware of the content of the fueling parameter optically or acoustically. For example, a first indication occurs when the fueling parameter indicates that with the present geodetic orientation the minimum percentage actually flows into the accumulation tank. When this is not the case, for example, a second display can be rendered.

According to another advantageous feature of the present invention, filling the fuel tank is not permitted, in particular a cover of the filler neck of the fuel tank is locked, when the fueling parameter indicates that the proportion is less than the minimum proportion. When it is determined for the present geodetic orientation of the fuel tank that the quantity of fuel expected to flow into the accumulation tank is not sufficient or is less than the quantity of fuel to be filled, then filling of the fuel tank is not permitted. For example, the driver is then prevented to fill the fuel tank, for example, by locking of the cover of the filler neck. The driver is then prevented to remove the cover for fueling the fuel tank through the filler neck. Disallowing fueling or the locking of the cover of the filler neck may be regarded as a haptic indication, so that the afore-described signaling device can be used for this purpose.

According to another advantageous feature of the present invention, the fueling orientation closest the to the geodetic orientation may be read out, for which the fueling parameter indicates that the proportion flowing into the accumulation tank is greater than or equal to the minimum proportion. Accordingly, not only the fueling parameter corresponding to the current geodetic orientation is determined, but also the fueling orientation, for which fueling can be carried out successfully. In this embodiment, in the presence of the read-out geodetic orientation, at least the minimum proportion of predetermined quantity of fuel flows into the accumulation tank. This fueling orientation can also be displayed, for example by way of the signaling device and/or a display device.

According to another advantageous feature of the present invention, an operation of an electric machine of a drive device of the motor vehicle may be allowed for moving the motor vehicle in the fueling direction even at a fill level that is less than the minimum level, or a drive unit the drive device may be operated for moving the motor vehicle in the fueling direction with an operating fuel different from the fuel, or for moving the motor vehicle in the fueling direction by performing an autonomous driving operation or by adjusting a chassis of the motor vehicle accordingly.

Thus, when fueling cannot be performed successfully with a particular geodetic orientation, the drive device may also be permitted to operate with an empty or an almost empty fuel tank. Otherwise, the operation of the drive device, in particular of the electric machine, may be prevented. Advantageously, a drive power required for moving the motor vehicle is provided by the electric machine associated with the drive device. Accordingly, the drive device may be implemented as a hybrid drive device, i.e. may have both an internal combustion engine and the electric machine, which are at least temporarily be able to commonly provide the drive power provided by the drive device for moving the motor vehicle.

Alternatively, a drive unit that does not require the presence of the particular fuel, but the presence of an operating fuel that is different from the fuel, may be used to move the motor vehicle in the fueling direction. The operating fuel may, for example, be a gas, in particular CNG or LPG. It is thus possible to operate the same drive unit that is normally operated with the fuel, also with the operating fuel.

According to another advantageous feature of the present invention, the chassis of the motor vehicle may be adjusted such that thereafter the fueling position is assumed. For this purpose, for example a spring device or a shock absorber of the suspension may be activated accordingly. The spring assembly can be formed, for example, as a fluid spring, in particular an air spring.

According to another advantageous feature of the present invention, the fuel tank may be constructed without an inlet conduit. As already explained above, the inlet conduit may be provided between the filler neck and the accumulation tank to ensure that a sufficient quantity of fuel enters the accumulation tank. However, this should not be the case here, so that the fuel tank is designed without an inlet conduit and is thus present without an inlet conduit.

According to another advantageous feature of the present invention, a vehicle sensor of a chassis of the motor vehicle may be used as a sensor. The chassis sensor is assigned to the chassis of the motor vehicle. For example, the chassis sensor is a displacement sensor, which can be used to determine spring travel of at least one shock absorber assembly of the chassis. It will be understood that an inclination sensor may also be used as a sensor, from which the roll angle and/or pitch angle, in particular with respect to a gravity vector, can be directly deduced.

According to another aspect of the present invention, a fuel tank system for a motor vehicle, in particular for performing a method as set forth above, includes a fuel tank with an accumulation tank, to which a suction side of a fuel pump is connected. The fuel tank system is configured to determine with at least one sensor a geodetic orientation of the fuel tank for a fill level of the fuel tank below a certain minimum fill level, to read out a fueling parameter from a characteristic curve field based on the geodetic orientation and to display the fueling parameter with a signaling device.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a schematic diagram of a fuel tank system for a motor vehicle according to the present invention.

DETAILED DESCRIPTION OF PREFERRED EMBODIMENTS

The depicted embodiments are to be understood as illustrative of the invention and not as limiting in any way. It should also be understood that the figure is not necessarily to scale and that embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a schematic diagram of a fuel tank system 1 for an unillustrated motor vehicle. The fuel tank system 1 includes a fuel tank 2 and a fuel pump 3. With the fuel pump 3, fuel can be conveyed from the fuel tank 2, in particular from an accumulation tank 4. A suction line 5 may be provided for this purpose. The accumulation tank 4 is advantageously arranged on a bottom 6 of the fuel tank 2. In particular, the accumulation tank 4 passes at least partially through the bottom 6, i.e. is at least partially lower than the bottom 6 of the fuel tank 2.

The fuel tank 2 may be subdivided by a web 7 into at least two regions 8 and 9. The accumulation tank 4 is present, for example, in the region 8. The web 7 is designed such that the regions 8 and 9 are not in direct fluid communication with each when the quantity of fuel in the fuel tank 2 is below a certain quantity of fuel. For this reason, at least one suction jet pump (not shown here) may be present for conveying fuel from the region 9 into the region 8, in particular into the accumulation tank 4.

Another suction jet pump may be in the range 8 and there also used to supply fuel in the accumulation tank. 4 The suction jet pump or the suction jet pumps are advantageously operated with fuel as a propellant, wherein the fuel can be the fuel conveyed by the fuel pump 3 from the accumulation tank 4.

The fuel tank 2 has furthermore a filler neck 10, which opens with one end into the fuel tank 2, in particular the region 8 of the fuel tank 2. The filler neck 10 hereby opens into the fuel tank 2 and is spaced from the accumulation tank 4. The side of the filler neck 10 facing away from the fuel tank 2 can be closed at least temporarily by a cover 11. This cover 11 is removed when fuel is to be introduced into the fuel tank 2 through the filler neck 10.

When a fill level of the fuel tank 2 is less than a predetermined minimum fill level, a geodesic orientation of the fuel tank is determined with at least one sensor 2. Subsequently, a fueling parameter is to be read from a characteristic curve field based on the determined geodetic orientation. This can then be displayed by an unillustrated signaling device. Additionally or alternatively, the cover 11 may be either locked or unlocked in response to the fueling parameter. The minimum fill level advantageously corresponds to an almost empty fuel tank 2.

The described procedure is applied when the fuel tank 2 is almost or largely empty. It should be possible even in this state to ensure reliable conveyance of fuel from the fuel tank 2 by way of the fuel pump 3 by introducing a predetermined quantity of fuel into the fuel tank 2 through the filler neck 10. The fueling parameter read out from the characteristic curve field now indicates whether this is possible for the currently present geodetic orientation of the fuel tank 2, i.e. whether at least a minimum proportion of the quantity of fuel filled or to be filled through the filler neck 10 flows in the accumulation tank 4. The geodetic orientation may include, for example, a roll angle and/or a pitch angle, which each describe the deflection about a particular axis of the fuel tank 2 and the motor vehicle.

Appropriate measures may be taken depending on the read-out fueling parameter. For example, the fueling parameter is displayed to a driver of the motor vehicle by way of a signaling device. Additionally or alternatively, filling the fuel tank may not be permitted when the fueling parameter indicates that the proportion of the quantity of fuel expected to flow through the filler neck 10 into the accumulation tank 4 is less than the minimum proportion. In a particularly advantageous embodiment, the cover 11 of the filler neck 10 is locked and prevented from being removed for fueling.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a fuel tank system for a motor vehicle, wherein the fuel tank system comprises a fuel tank with an accumulation tank to which a suction side of a fuel pump is connected, the method comprising:
- determining with at least one sensor a geodetic orientation of the fuel tank when a fill level of the fuel tank is below a fill level of at most 2%;
- reading out a fueling parameter from a characteristic curve field based on the geodetic orientation;
- displaying the fueling parameter by way of a signaling device;
- storing in the characteristic curve field respective fueling parameters for a plurality of geodetic orientations of the fuel tank, with a respective fueling parameter indicating whether for a corresponding geodetic orientation at least a minimum proportion of a predetermined quantity of fuel introduced through a filler neck flows into the accumulation tank;
- reading from the characteristic curve field a fueling orientation that is closest to the geodetic orientation of the fuel tank, for which the fueling parameter indicates that a proportion flowing into the accumulation tank is greater than or equal to the minimum proportion; and
- in order to move the motor vehicle into the fueling orientation, allowing an electric machine of a drive device of the motor vehicle to operate even for a fill level that is less than the predetermined minimum fill level.

2. The method of claim 1, wherein the geodetic orientation includes a roll angle or a pitch angle, or both.

3. The method of claim 1, wherein the signaling device generates an optical signal or an acoustic signal, or both.

4. The method of claim 1, wherein filling of the fuel tank is not permitted, when the fueling parameter indicates that a proportion of the predetermined quantity of fuel is less than the minimum proportion.

5. The method of claim 4, further comprising locking a cover of the filler neck of the fuel tank to prevent filling of the fuel tank.

6. The method of claim 1, further comprising in order to move the motor vehicle into the fueling orientation, operating a drive unit of the drive device with an operating fuel that is different from the fuel.

7. The method of claim 1, further comprising in order to move the motor vehicle into the fueling orientation, performing an autonomous driving operation.

8. The method of claim 1, further comprising in order to move the motor vehicle into the fueling orientation, adjusting a chassis of the motor vehicle.

9. The method of claim 1, wherein the fuel tank is constructed without an inlet conduit disposed between a filler neck and the accumulation tank.

10. The method of claim 1, wherein the at least one sensor is a chassis sensor disposed on a chassis of the motor vehicle.

11. A fuel tank system for a motor vehicle, comprising a fuel tank having an accumulation tank to which a suction side of a fuel pump is connected, said fuel tank system being configured to:
- determine with at least one sensor a geodetic orientation of the fuel tank when a fill level of the fuel tank is below a fill level of at most 2%,
- read out a fueling parameter from a characteristic curve field based on the geodetic orientation,
- display the fueling parameter by way of a signaling device,
- store in the characteristic curve field respective fueling parameters for a plurality of geodetic orientations of the fuel tank, with a respective fueling parameter indicating whether for a corresponding geodetic orientation at least a minimum proportion of a predetermined quantity of fuel introduced through a filler neck flows into the accumulation tank,
- read from the characteristic curve field a fueling orientation that is closest to the geodetic orientation of the fuel tank, for which the fueling parameter indicates that a proportion flowing into the accumulation tank is greater than or equal to the minimum proportion, and
- in order to move the motor vehicle into the fueling orientation, allow an electric machine of a drive device of the motor vehicle to operate even for a fill level that is less than the predetermined minimum fill level.

* * * * *